March 2, 1954   W. H. LINDSEY ET AL   2,670,912
MEANS FOR PREVENTING THE FORMATION OF ICE ON AN
AIRCRAFT OR IN A GAS TURBINE ENGINE THEREFOR
Filed Feb. 27, 1951                                              2 Sheets-Sheet 1

INVENTORS:
W. H. LINDSEY
L. R. FELLOWS
by Mawhinney & Mawhinney
ATTYS.

INVENTORS:
W. H. LINDSEY
L. R. FELLOWS

Patented Mar. 2, 1954

2,670,912

UNITED STATES PATENT OFFICE 2,670,912

MEANS FOR PREVENTING THE FORMATION OF ICE ON AN AIRCRAFT OR IN A GAS TURBINE ENGINE THEREFOR

William H. Lindsey and Leslie R. Fellows, Coventry, England, assignors to Armstrong Siddeley Motors Limited, Coventry, England Application February 27, 1951, Serial No. 213,028

Claims priority, application Great Britain April 29, 1950

6 Claims. (Cl. 244—134)

This invention relates to an aircraft. It is of considerable importance, on an aircraft powered by a gas turbine engine, to be able to prevent the formation of ice on parts of the engine where it would interfere with the satisfactory functioning of the engine or even cause damage thereto (such as on the air intake or early compressor blade rows) at those times when atmospheric conditions are such as to encourage ice to form.

It is also of importance to prevent the icing up of an aircraft propeller, or of the leading edge of an aircraft wing, or of aircraft control surfaces.

It is known to spray an aircraft propeller or the leading edge of an aircraft wing, or other vulnerable points, with an anti-icing fluid (such as methanol), and, in addition, to utilise an ice detector to ascertain when icing conditions exist.

One known ice detector is (as shown in Figure 2, hereinafter referred to) in the form of a chamber disposed in the air stream and having a number of metered holes in its leading side, whilst on the opposite or sheltered side are fewer similar holes so that a change in pressure will occur in the chamber whenever ice closes the holes in the leading side. The pressure change in the detector, when it responds to the formation of ice in this way, can be used to operate an electric switch, relay or the like device which controls a supply of anti-icing fluid.

The main object of the present invention is to use an anti-icing fluid, as aforesaid, in an economical manner.

The invention consists in the use of at least two ice detectors which are designed or positioned to respond to different degrees of icing, and each detector operates a control unit for supplying, during response of the detector, a predetermined quantity of anti-icing fluid to a part (e. g., into the air intake of a gas turbine engine powering the aircraft) upon which the formation of ice is to be prevented, at least one of the detectors being out of the path of the de-icing fluid so as not to be influenced thereby, whereby the total quantity of anti-icing fluid supplied at any moment will, in general, vary dependently (within limits) upon the icing conditions then obtaining.

Preferably the first-responding detector, at least, is provided with a thermal de-icing means as aforesaid.

Figure 1:
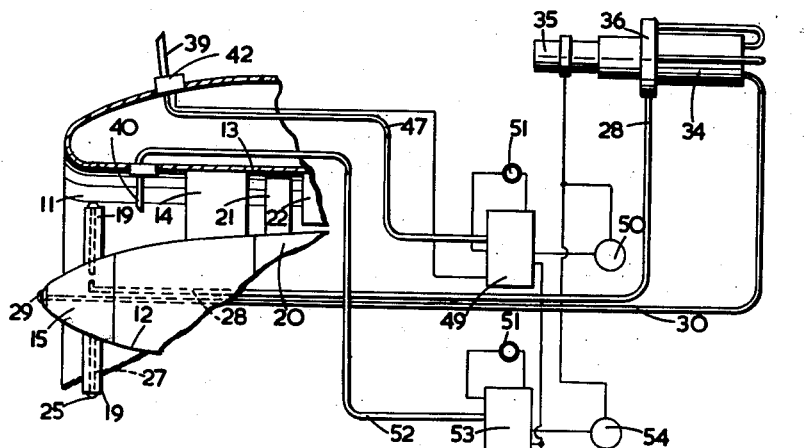
Figure 1 is a fragmentary part-sectional elevation of the intake end of a gas turbine engine of an aircraft, fitted with ice-preventing equipment according to the invention.
Figure 2:
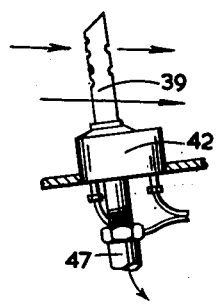
Figure 2 is a view of the external detector, to a larger scale.

The drawings show part of a gas turbine engine having an intake passage 11 bounded internally by an annular casing 12 which is supported from an outer annular casing 13 by struts 14. Forwardly of the casing 12 is a spinner 15 journalled by bearings 16, 17 upon a shaft 18 extending forwardly from the casing 12. The spinner carries vanes or blades 19 extending into the inlet end of the intake passage, the airstream acting thereon serving to rotate the spinner. Rearwardly of the casing 12 is the compressor rotor 20 with a circle of blades 21 coacting with a circle of stationary blades 22.

The anti-icing fluid may be delivered to one or more spraying devices, which may be stationary. But preferably, in the case of a gas turbine engine, such a spraying device is adapted to rotate round the zone of the air intake, so as to ensure as satisfactory a distribution of the fluid as possible. In the construction shown, spraying devices, in the form of forwardly-facing spray nozzles 25, are mounted at the ends of the blades 19 and connected with a channel-shaped slinger ring 26, carried by the spinner, by passages 27 along the blades, the supply to the slinger ring being from the end of a stationary pipe line 28 directing the anti-icing fluid into the hollow of the slinger ring, whence it is sprayed from the nozzles 25 under centrifugal action. In addition, a spray nozzle 29 is mounted centrally of the spinner at the forward end of the shaft 18, being supplied from the pipe line 30 through the hollow interior of the shaft.

34 represents a multi-cylinder pressure pump, for the anti-icing fluid, driven by an electric motor 35, one of the cylinders feeding directly to the pipe line 30 and the remainder to an annular pipe 36 to which the pipe line 28 is connected.

In Figure 1 of the drawings, use is made of one ice detector 39 mounted externally of the air intake, and of a second ice detector 40 mounted internally of the air intake downstream of the spraying devices 25 and 29. It is intended that the external detector 39 shall be the first to respond, i. e., shall be the only one to respond in minimum icing conditions, and that the internal detector 40, when responding later to more severe conditions, will provide a supply of fluid which, jointly with that provided by the external detector 39, will be sufficient for the maximum icing conditions likely to be encountered.

The two detectors could, in point of fact, be similar and positioned (e. g., the external in a choke tube if necessary) so that the external detector will be the first to respond. Alternatively, the internal detector may have larger openings on its leading side (see Figure 3) so that, independently of the positions of the two detectors, the internal detector would not respond until after the external detector. In practice, the internal detector, being subjected to the fluid spray introduced by the external detector, will never respond to minimum icing conditions, but only to more severe conditions.

Once the external detector has responded, there would be a large time lag before it again became free to sample air when icing conditions had ceased—which would, of course, result in waste of the anti-icing fluid. To obviate that disadvantage it is preferred to provide the first-responding detector with a known form of thermal de-icing means, indicated at 42, which can be operated periodically—for example, every thirty seconds. As icing conditions might still obtain, however, it would be undesirable that the supply of anti-icing fluid should cease in a similar periodic manner, and, in consequence, it is preferable to arrange that the supply of fluid due to the first-responding detector 39 should not be discontinued, when the detector is de-iced, for a period which is longer than the intermittent periodicity of the thermal de-icing means, i. e., longer than thirty seconds in the example assumed above. It might be preferable for this time lag to be more in the nature of, say, three or four minutes.

In icing conditions which are sufficiently bad for the internal detector 40 to respond as well as the external detector, the additional fluid sprayed into the air stream entering the air intake will serve for de-icing the internal detector, and, in consequence, in those conditions, the supply of fluid due to the internal detector will be an intermittent one.

Figure 3:
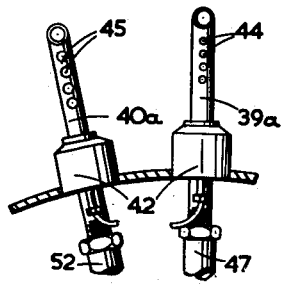
Figure 3 is a view, to the same scale as that of Figure 2, showing an alternative arrangement of different-responding ice detector.

Whilst reference has been made above to an arrangement incorporating one external and one internal detector, there could, if preferred, be only two or more external detectors arranged to respond sequentially to icing conditions, as indicated by Figure 3, and in this event, as none would be subjected to the spray resulting from the first-responding detector, each should be provided with an intermittently-operable thermal de-icing means as aforesaid. 39a represents the first-responding detector, with relatively small, forwardly-facing holes 44, and 40a the second one, with larger holes 45.

Figure 4:
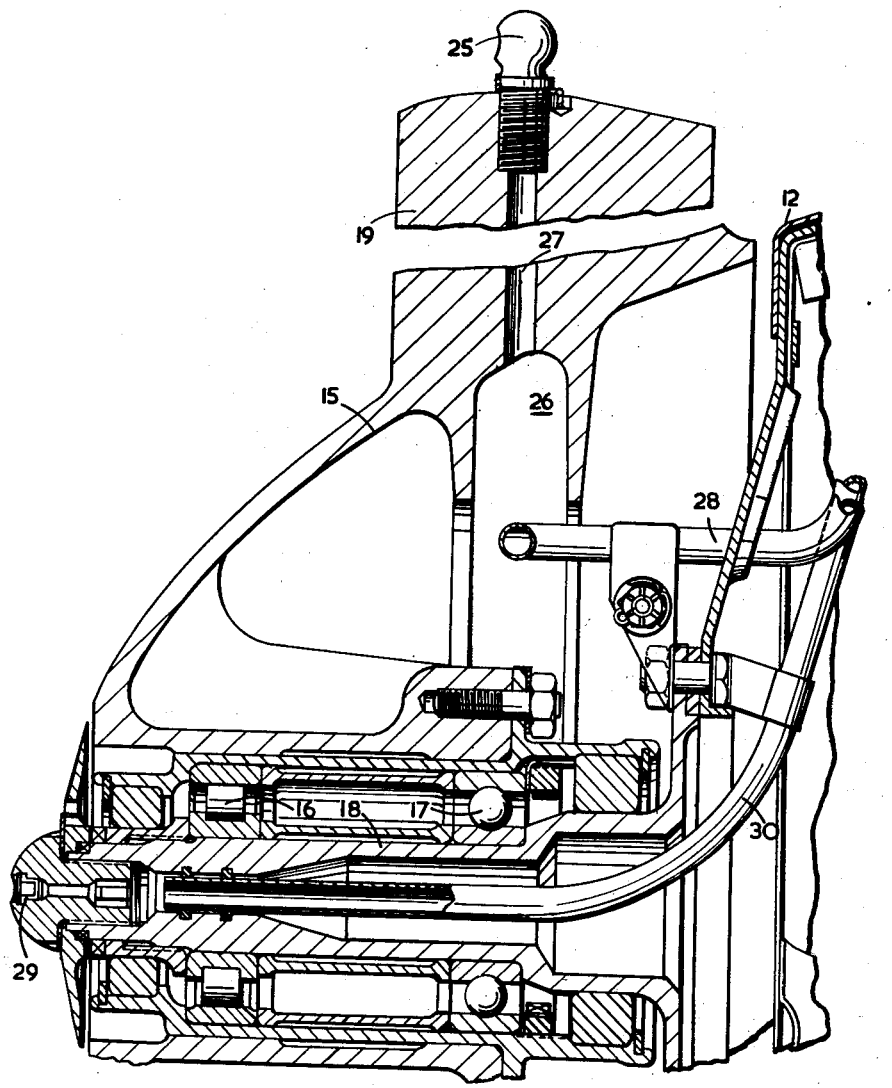
Figure 4 is a fragmentary section of the spinner and its associated parts of Figure 1, to a much larger scale.

As regards an aircraft having a propellor driven by a gas turbine engine, a convenient method of spraying the fluid is to provide a pair of diametrically-opposite spray devices at the rear end of the propellor spinner, these devices projecting radially beyond the spinner and spraying directly towards the annular opening of the air intake as the spinner revolves, rather as shown by Figures 1 and 4.

Referring once more to Figures 1 and 3, the first detector 39 (or 39a) is shown as being connected by a pipe line 47 with a known form of control unit 49 incorporating a suction switch which, when actuated on the response of the detector, energises the motor 35, through a rheostat 50, to operate the motor at an appropriate speed to give a predetermined pump delivery. The thermal switch controlling the de-icing means is also arranged in the control unit 49, and 51 indicates a signal device. Similarly, the second detector 40 (or 40a) is connected by a pipe line 52 with a control unit 53 which is generally similar to the control unit 49, the associated rheostat 54, on the response of the second detector, then providing a parallel supply to the motor to operate it at an increased speed in order to increase the pump delivery as necessary.

Whilst reference has been particularly made above to applying the invention for preventing the icing up of a gas turbine engine, it should be clearly understood that the invention is not restricted in this respect, but can likewise be applied to the de-icing of a propellor or of other vulnerable parts of an aircraft.

What we claim as our invention and desire to secure by Letters Patent of the United States is:

1. Ice-preventing equipment, for an aircraft, including at least two ice detectors, respective control units to be operated by said detectors for supplying, during response of the respective detector, a predetermined quantity of anti-icing fluid to a part upon which the formation of ice is to be prevented, one of said detectors being supported to be outside the path of the supply of de-icing fluid to said part so as not to be influenced by said supply but to respond to an icing condition, and the other detector being in the path of said supply of de-icing fluid to said part so as to respond to a more severe icing condition, whereby an additional quantity of de-icing fluid will be supplied to the said part when the last-mentioned detector responds to the more severe icing condition and also be supplied to said last-mentioned detector for de-icing it.

2. An aircraft powered by a gas turbine engine, and provided with ice-preventing equipment according to claim 1, in which the first-responding detector is placed exteriorly of a casing of the engine and the later-responding detector is placed in an air intake passage of said engine, the anti-icing fluid supplied as a result of the operation of said first-responding detector being distributed into the intake passage upstream of the later-responding detector.

3. An aircraft powered by a gas turbine engine, according to claim 2, in which the engine has a rotatable spinner at the forward end of the intake, the spinner having a slinger ring to which the anti-icing fluid is supplied, and the spinner having at least one jet nozzle supplied with the fluid from the slinger ring and distributing it into an air intake of a compressor of the engine.

4. An aircraft powered by a gas turbine engine, according to claim 3 and in which the turbine drives the aircraft by a jet reaction, the spinner having vanes or blades disposed in the airstream at the intake to the compressor and arranged so that the spinner will be rotated thereby.

5. Ice-preventing equipment for a part of an aircraft, said part being in an air-stream, including at least two ice detectors, a means for delivering a spray of an anti-icing fluid into the airstream in a position upstream of said part, upon which latter the formation of ice is to be prevented, and a respective control means operated by each ice detector for controlling said spray-delivery means, one of said detectors being arranged to respond to an icing condition extraneous to said airstream for causing a spray of said fluid to be delivered to said airstream in a position upstream of said part, and the other said detector being arranged in said airstream intermediate said spray-delivery means and said part and being responsive to a more severe icing condition than said one detector for causing an additional quantity of said fluid to be sprayed into said airstream.

6. Ice-preventing equipment, for an aircraft, including at least two ice detectors, an electric-motor driven pump for delivering anti-icing fluid to a spray-forming means arranged in an airstream in a position upstream of a part on which the formation of ice is to be prevented, respective control units to be operated by said detectors, respective rheostats to be energised by the operation of said control units, said rheostats connected in the circuit of the electric motor of said electric-motor driven pump and operable by their respective associated detectors when the latter respond to icing conditions, one of said detectors being arranged to respond to an icing condition extraneous to said airstream whereby to operate its associated rheostat for the driving of said electric motor at one speed for causing said pump to deliver a supply of said fluid to said spray-forming means, and the other said detector being arranged in said airstream intermediate said spray-forming means and said part and being responsive to a more severe icing condition than said one detector whereby to operate its associated rheostat for the driving of said electric motor at a higher speed for causing said pump to deliver an increased supply of said fluid to said spray-forming means.

WILLIAM H. LINDSEY.
LESLIE R. FELLOWS.

References Cited in the file of this patent

UNITED STATES PATENTS

| Number | Name | Date |
|---|---|---|
| 2,182,530 | Baer | Dec. 5, 1939 |
| 2,338,574 | Cunningham | Jan. 4, 1944 |
| 2,469,375 | Flagle | May 10, 1949 |
| 2,541,512 | Hahn | Feb. 13, 1951 |
| 2,563,054 | Messinger et al. | Aug. 7, 1951 |

FOREIGN PATENTS

| Number | Country | Date |
|---|---|---|
| 468,294 | Canada | Sept. 26, 1950 |
| 618,224 | Great Britain | Feb. 17, 1949 |